United States Patent
Maeda

(10) Patent No.: US 11,226,599 B2
(45) Date of Patent: Jan. 18, 2022

(54) MACHINE LEARNING SYSTEM, CONTROL DEVICE, AND MACHINE LEARNING METHOD FOR OPTIMIZING FILTER COEFFICIENTS

(71) Applicant: FANUC CORPORATION, Yamanashi (JP)

(72) Inventor: Kazuomi Maeda, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 231 days.

(21) Appl. No.: 16/707,113

(22) Filed: Dec. 9, 2019

(65) Prior Publication Data

US 2020/0241485 A1    Jul. 30, 2020

(30) Foreign Application Priority Data

Jan. 24, 2019    (JP) .............................. JP2019-010111

(51) Int. Cl.
*G05B 13/02*    (2006.01)
*G05B 13/04*    (2006.01)
*G06N 20/00*    (2019.01)

(52) U.S. Cl.
CPC ....... *G05B 13/0265* (2013.01); *G05B 13/042* (2013.01); *G06N 20/00* (2019.01)

(58) Field of Classification Search
CPC ............. H04N 1/0048; H04N 1/00474; H04N 1/00411; H04N 1/00464; H04N 1/00127; H04N 2201/0094

See application file for complete search history.

(56) References Cited

FOREIGN PATENT DOCUMENTS

| JP | 5-19858 | 1/1993 |
| JP | 2008-312339 | 12/2008 |
| JP | 2009-104439 | 5/2009 |

*Primary Examiner* — Tejal Gami
(74) *Attorney, Agent, or Firm* — Wenderoth, Lind & Ponack, L.L.P.

(57) ABSTRACT

A machine learning system that optimizes coefficients of at least one filter provided in a servo control device that controls a motor includes: an initial setting unit that sets initial values of the coefficients of the filter so as to attenuate at least one specific frequency component; a frequency characteristic calculation unit that calculates at least one of an input/output gain and an input/output phase delay of the servo control device based on an input signal and an output signal of the servo control device, of which the frequencies change; and a filter characteristic removing unit that removes filter characteristics of an initial filter in which the initial values are set to the filter from at least one of the input/output gain and the input/output phase delay obtained based on the input signal and the output signal obtained using the initial filter at the start of machine learning.

9 Claims, 11 Drawing Sheets

MACHINE LEARNING SYSTEM, CONTROL DEVICE, AND MACHINE LEARNING METHOD FOR OPTIMIZING FILTER COEFFICIENTS

This application is based on and claims the benefit of priority from Japanese Patent Application No. 2019-010111, filed on 24 Jan. 2019, the content of which is incorporated herein by reference.

BACKGROUND OF THE INVENTION

Field of the Invention

The present invention relates to a machine learning system that optimizes coefficients of a filter provided in a servo control device that controls a motor of a machine tool, a robot, or an industrial machine and relates to a control device including the machine learning system, and a machine learning method.

Related Art

A device that automatically adjusts characteristics of a filter is known (see Patent Document 1 and Patent Document 2, for example). Patent Document 1 discloses a servo actuator "which includes a velocity feedback loop that controls the velocity of a motor and in which a notch filter means is inserted in the velocity feedback loop to remove mechanical resonance, the servo actuator including: a data collection means that acquires data indicating frequency response characteristics of the velocity feedback loop; a moving average means that calculates a moving average of the data acquired by the data collection means; a comparing means that compares the data obtained by the moving average means with the data obtained by the data collection means to extract the resonance characteristics of the velocity feedback loop; and a notch filter setting means that sets the frequency and the Q-value of the notch filter means on the basis of the resonance characteristics extracted by the comparing means".

Patent Document 2 discloses a servo actuator "which superimposes an AC signal obtained by sweeping frequencies on a velocity command value signal during a tuning mode, detects an amplitude of a torque command value signal obtained from a velocity control unit as a result of the superimposition, and sets the frequency of the torque command value signal when the rate of change in the amplitude changes from positive to negative as a central frequency of a notch filter".

Patent Document 3 discloses a motor control device "including a notch filter capable of changing a notch filter parameter including a notch frequency and a notch width, a vibration frequency estimation unit that estimates a vibration frequency, and a notch filter parameter setting unit that sets a frequency between the notch frequency of the notch filter and the vibration frequency as a new notch frequency and changes the notch width so that an original notch frequency component and an estimated frequency component are attenuated".

Patent Document 1: Japanese Unexamined Patent Application, Publication No. 2009-104439
Patent Document 2: Japanese Unexamined Patent Application, Publication No. H05-19858
Patent Document 3: Japanese Unexamined Patent Application, Publication No. 2008-312339

SUMMARY OF THE INVENTION

However, when the characteristics of a filter (for example, a notch filter) are determined, it is necessary to determine a plurality of parameters such as an attenuation coefficient, as well as a central frequency of a band to be removed and a bandwidth, and it is desirable to adjust these parameters to obtain an optimal value. Moreover, if these parameters are not set appropriately, it may not be possible to sufficiently suppress resonance, or a phase delay of a servo control unit may increase and servo control performance may deteriorate.

(1) A machine learning system according to an aspect of the present disclosure is a machine learning system that performs machine learning of optimizing coefficients of at least one filter (for example, a filter 130 to be described later) provided in a servo control device (for example, a servo control device 100 to be described later) that controls a motor (for example, a motor 150 to be described later), the system including:
an initial setting unit (for example, an initial setting unit 500 to be described later) that sets initial values of the coefficients of the filter so as to attenuate at least one specific frequency component;
a frequency characteristic calculation unit (for example, a frequency characteristic calculation unit 300 to be described later) that calculates at least one of an input/output gain and an input/output phase delay of the servo control device on the basis of an input signal and an output signal of the servo control device, of which the frequencies change; and
a filter characteristic removing unit (for example, a filter characteristic removing unit 4011 to be described later) that removes filter characteristics of an initial filter, in which the initial values are set to the filter by the initial setting unit, from at least one of the input/output gain and the input/output phase delay obtained on the basis of the input signal and the output signal obtained using the initial filter at the start of machine learning, wherein the machine learning system starts machine learning of the coefficients of the filter in which the filter characteristics of the initial filter are removed by the filter characteristic removing unit so that at least the input/output gain decreases or the phase delay decreases.

(2) In the machine learning system according to (1), the input signal of which the frequency changes may be a sinusoidal wave of which the frequency changes, and the sinusoidal wave may be generated by a frequency generation unit (for example, a frequency generation unit 200 to be described later), and the frequency generation unit may be provided inside or outside the servo control device.

(3) The machine learning system according to (1) or (2) may further include a machine learning unit (for example, a machine learning unit 400 to be described later) including:
a state information acquisition unit (for example, a state information acquisition unit 401 to be described later) that acquires state information including the input/output gain and the input/output phase delay of the servo control device output from the frequency characteristic calculation unit and the coefficients of the initial filter or the coefficients of the filter after the start of the machine learning;
an action information output unit (for example, an action information output unit 403 to be described later) that outputs action information including adjustment information of the coefficients of the initial filter or the coefficients of the filter after the start of the machine learning, included in the state information;

a reward output unit (for example, a reward output unit 4021 to be described later) that outputs a reward value of reinforcement learning based on the input/output gain and the input/output phase delay output from the state information acquisition unit; and a value function updating unit (for example, a value function updating unit 4022 to be described later) that updates an action value function on the basis of the reward value output by the reward output unit, the state information, and the action information.

(4) In the machine learning system according to (3), the frequency characteristic calculation unit may output the input/output gain and the input/output phase delay, and the reward output unit may calculate a reward based on the input/output phase delay when the input/output gain of the servo control device is equal to or smaller than the input/output gain of an input/output gain standard model calculated from the characteristics of the servo control device.

(5) In the machine learning system according to (4), the input/output gain of the standard model may be a constant value at a predetermined frequency or higher.

(6) In the machine learning system according to (4) or (5), the reward output unit may calculate the reward so that the input/output phase delay decreases.

(7) The machine learning system according to any one of (3) to (6) may further include an optimization action information output unit (for example, an optimization action information output unit 405 to be described later) that outputs adjustment information of the coefficients on the basis of a value function updated by the value function updating unit.

(8) A control device according to another aspect of the present disclosure is a control device (for example, a control device 10 to be described later) including: the machine learning system according to any one of (1) to (7); and a servo control device (for example, a servo control device 100 to be described later) that controls a motor (for example, a motor 150 to be described later) and has at least one filter (for example, a filter 130 to be described later) for attenuating a specific frequency component.

(9) A machine learning method according to still another aspect of the present disclosure is a machine learning method of a machine learning system that performs machine learning of optimizing coefficients of at least one filter (for example, a filter 130 to be described later) for attenuating at least one specific frequency component, provided in a servo control device (for example, a servo control device 100 to be described later) that controls a motor (for example, a motor 150 to be described later), the method including:

setting initial values of the coefficients of the filter so as to attenuate at least one specific frequency component; calculating at least one of an input/output gain and an input/output phase delay of the servo control device on the basis of an input signal and an output signal of the servo control device, of which the frequencies change;

removing filter characteristics of an initial filter, in which the initial values are set to the filter, from at least one of the input/output gain and the input/output phase delay obtained on the basis of the input signal of the servo control device and the output signal of the servo control device obtained using the initial filter at the start of machine learning; and starting machine learning of the coefficients of the filter in which the filter characteristics are removed so that at least the input/output gain decreases or the phase delay decreases.

According to an aspect, it is possible to set optimal parameters of a filter associated with a servo control device.

DETAILED DESCRIPTION OF THE INVENTION

Hereinafter, an embodiment of the present disclosure will be described in detail with reference to the drawings.

Figure 1:
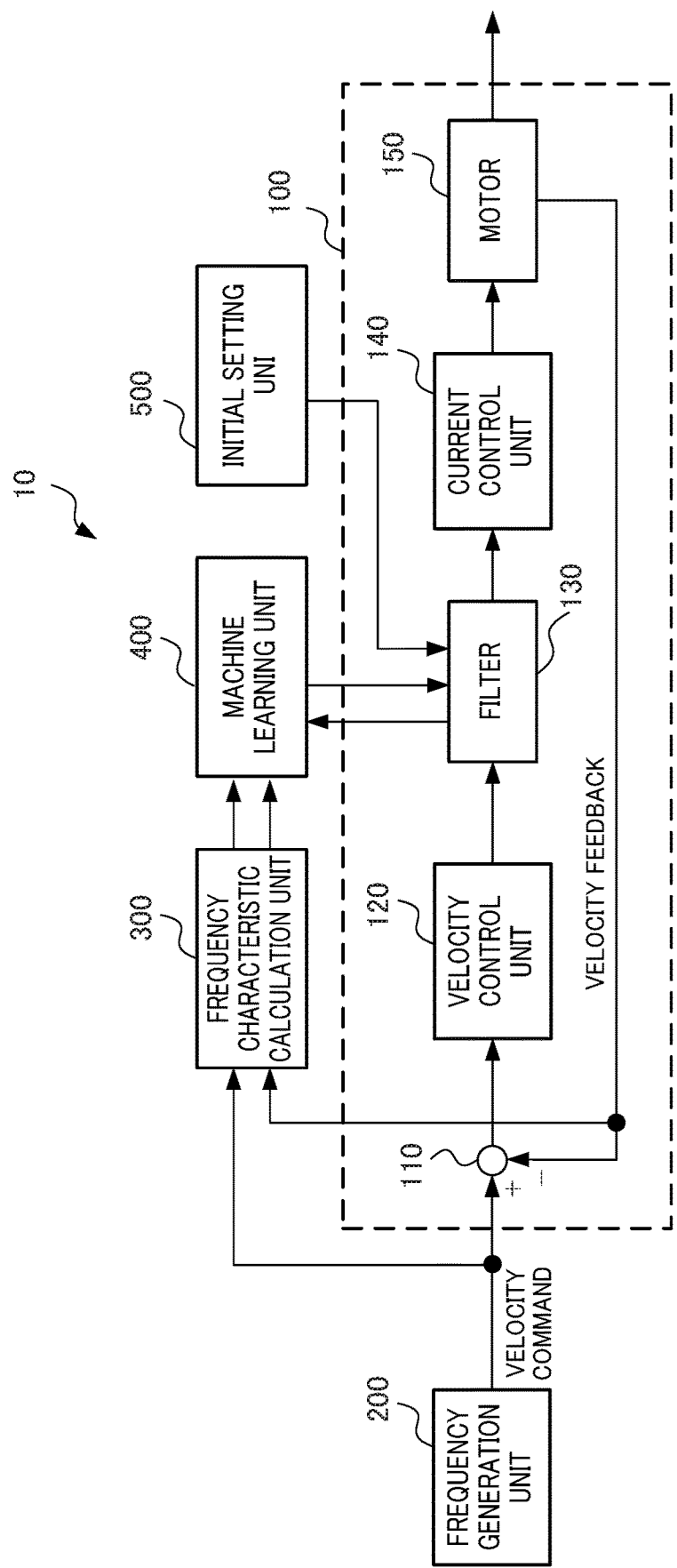
FIG. 1 is a block diagram illustrating a control device including a machine learning system according to an embodiment.

FIG. 1 is a block diagram illustrating a control device including a machine learning system according to an embodiment. A control target of a control device 10 is a machine tool, a robot, or an industrial machine, for example. The control device 10 may be provided as a part of a control target such as a machine tool, a robot, or an industrial machine.

The control device 10 includes a servo control unit 100 serving as a servo control device, a frequency generation unit 200, a frequency characteristic calculation unit 300, a machine learning unit 400, and an initial setting unit 500. One or two or more of the frequency generation unit 200, the frequency characteristic calculation unit 300, the machine learning unit 400, and the initial setting unit 500 may be provided in the servo control unit 100. Moreover, one of the initial setting unit 500 and the frequency characteristic calculation unit 300 or both may be provided in the machine learning unit 400. The frequency characteristic calculation unit 300, the machine learning unit 400, and the initial setting unit 500 form a machine learning system. The frequency characteristic calculation unit 300, the machine learning unit 400, and the initial setting unit 500 may each be provided as independent devices and may be provided as one device.

Moreover, one of the frequency characteristic calculation unit 300, the machine learning unit 400, and the initial setting unit 500 and the remaining two units may form two devices. In any case, the units form a machine learning system.

The servo control unit 100 includes a subtractor 110, a velocity control unit 120, a filter 130, a current control unit 140, and a servo motor 150. The subtractor 110, the velocity control unit 120, the filter 130, the current control unit 140, and the servo motor 150 form a velocity feedback loop. Although the servo motor 150 serving as a motor will be described as a motor that performs rotational motion, the servo motor 150 may be a linear motor that performs linear motion.

The subtractor 110 calculates a difference between an input velocity command and a feedback detection velocity and outputs the difference to the velocity control unit 120 as a velocity error.

The velocity control unit 120 adds a value obtained by multiplying and integrating an integral gain K1v by the velocity error and a value obtained by multiplying a proportional gain K2v by the velocity error and outputs an addition result to the filter 130 as a torque command.

The filter 130 is a filter that attenuates a specific frequency component, and for example, a notch filter or a low-pass filter is used. A resonance point is present in a machine such as a machine tool driven by a motor, and resonance may increase in the servo control unit 100. In this case, the resonance can be reduced using the notch filter, for example.

The output of the filter 130 is output to the current control unit 140 as a torque command. Expression 1 (indicated as Math. 1 below) indicates a transfer function F(s) of a notch filter as the filter 130. The optimal values of the coefficients $a_i$ and $b_j$ ($0 \leq i \leq m$, $0 \leq j \leq n$, and m and n are natural numbers) of Expression 1 are machine-learned by the machine learning unit 400.

$$F(s) = \frac{b_0 + b_1 s + b_2 s^2 + \cdots + b_n s^n}{a_0 + a_1 s + a_2 s^2 + \cdots + a_m s^m} \quad \text{[Math. 1]}$$

The current control unit 140 generates a current command for driving the servo motor 150 on the basis of a torque command and outputs the current command to the servo motor 150. A rotational angular position of the servo motor 150 is detected by a rotary encoder (not shown) provided in the servo motor 150 and the velocity detection value is input to the subtractor 110 as a velocity feedback. The servo control unit 100 is configured in this manner, and the control device 10 further includes the frequency generation unit 200, the frequency characteristic calculation unit 300, the machine learning unit 400, and the initial setting unit 500 in order to machine-learn optimal parameters of the filter.

The frequency generation unit 200 outputs a sinusoidal signal to the subtractor 110 of the servo control unit 100 and the frequency characteristic calculation unit 300 as a velocity command while changing a frequency. The velocity command is an input signal to the servo control unit 100.

Figure 2:
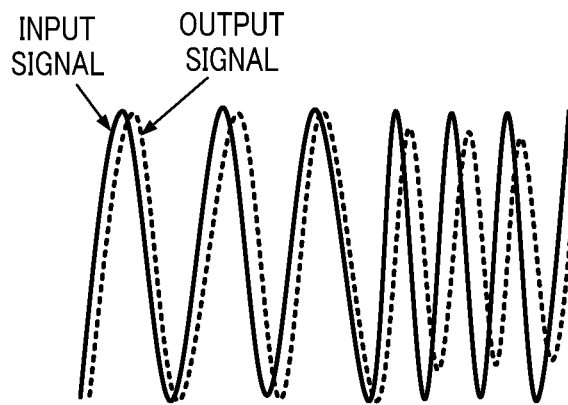
FIG. 2 is a diagram illustrating a velocity command serving as an input signal and a detection velocity serving as an output signal.
Figure 3:
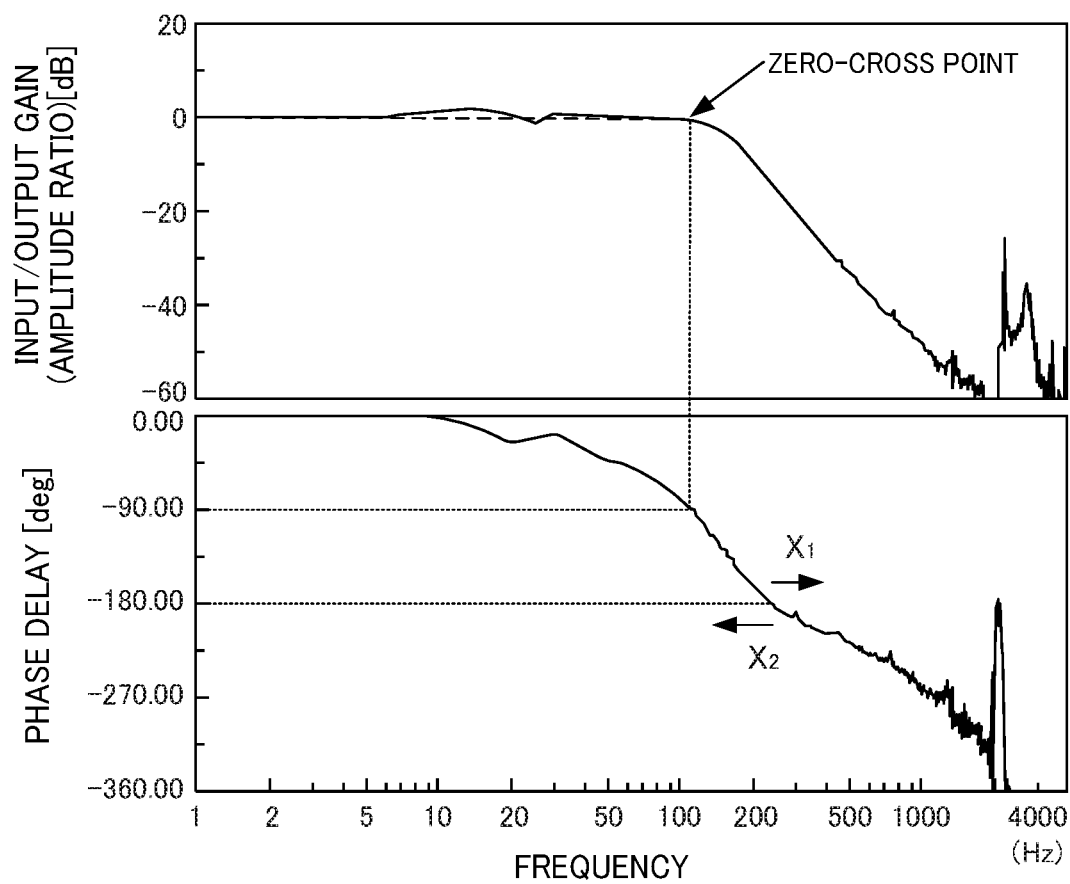
FIG. 3 is a diagram illustrating the frequency characteristics of an amplitude ratio and a phase delay between an input signal and an output signal.

The frequency characteristic calculation unit 300 calculates an amplitude ratio (an input/output gain) and a phase delay between input and output signals (input/output) for each of frequencies defined by the velocity command using the velocity command (a sinusoidal wave) and a detection velocity (a sinusoidal wave) serving as the output signal output from a rotary encoder (not shown). FIG. 2 is a diagram illustrating a velocity command serving as an input signal and a detection velocity serving as an output signal. FIG. 3 is a diagram illustrating the frequency characteristics of an amplitude ratio and a phase delay between an input signal and an output signal. As illustrated in FIG. 2, the frequency of the velocity command output from the frequency generation unit 200 changes, and the frequency characteristics of an input/output gain (an amplitude ratio) and a phase delay as illustrated in FIG. 3 are obtained.

The machine learning unit 400 performs machine learning (hereinafter referred to as learning) on the coefficients $a_i$ and $b_j$ of a transfer function F(s) of the filter 130 using the input/output gain (the amplitude ratio) and the phase delay output from the frequency characteristic calculation unit 300. Although the learning of the machine learning unit 400 is performed before shipping, relearning may be performed after shipping.

The initial setting unit 500 sets the initial values of the coefficients of the transfer function F(s) of the filter 130 at or before the start of the learning of the machine learning unit 400. The filter 130 in which initial values are set is referred to as an initial filter. The coefficients of the initial values are set so as to suppress a resonance frequency. The reason why the initial values of the coefficients of the filter 130 are set so as to suppress a resonance frequency is because, if there is a mechanical resonance point, large vibrations may occur due to excitation and it may become impossible to measure data such as a detection velocity. A filter adjustment method disclosed in a servo motor control device described in Japanese Unexamined Patent Application, Publication No. 2016-034224 and a filter adjustment method disclosed in a servo control device described in Japanese Unexamined Patent Application, Publication No. 2017-022855 can be used as a method for setting the initial values of the coefficients of a filter.

In the servo motor control device disclosed in Japanese Unexamined Patent Application, Publication No. 2016-034224, a sinusoidal wave generation unit generates a sinusoidal disturbance value and a frequency response calculation unit calculates a frequency response when the sinusoidal disturbance value is input to a velocity control loop. A resonance frequency detection unit detects a resonance frequency at which the gain of the frequency response is maximized, and a resonance frequency comparing unit measures stiffness of a machine tool on the basis of the resonance frequency and adjusts a filter with respect to the resonance frequency.

In the servo control device disclosed in Japanese Unexamined Patent Application, Publication No. 2017-022855, a sinusoidal disturbance input unit performs sinusoidal sweeping on a velocity control loop, and a frequency characteristic calculation unit estimates the gain and phase of velocity control loop input and output signals from the output of the velocity control loop. The frequency characteristic calculation unit expresses the output of the velocity control loop using a Fourier series which has an arbitrary number of terms and uses a disturbance input frequency from the sinusoidal disturbance input unit as a fundamental frequency, and calculates frequency characteristics by calculating the amplitude and phase of a fundamental component of the Fourier series. After that, a resonance frequency detection unit detects a resonance frequency from the frequency characteristics, and a filter adjustment unit adjusts a filter according to the detected resonance frequency.

Figure 4:
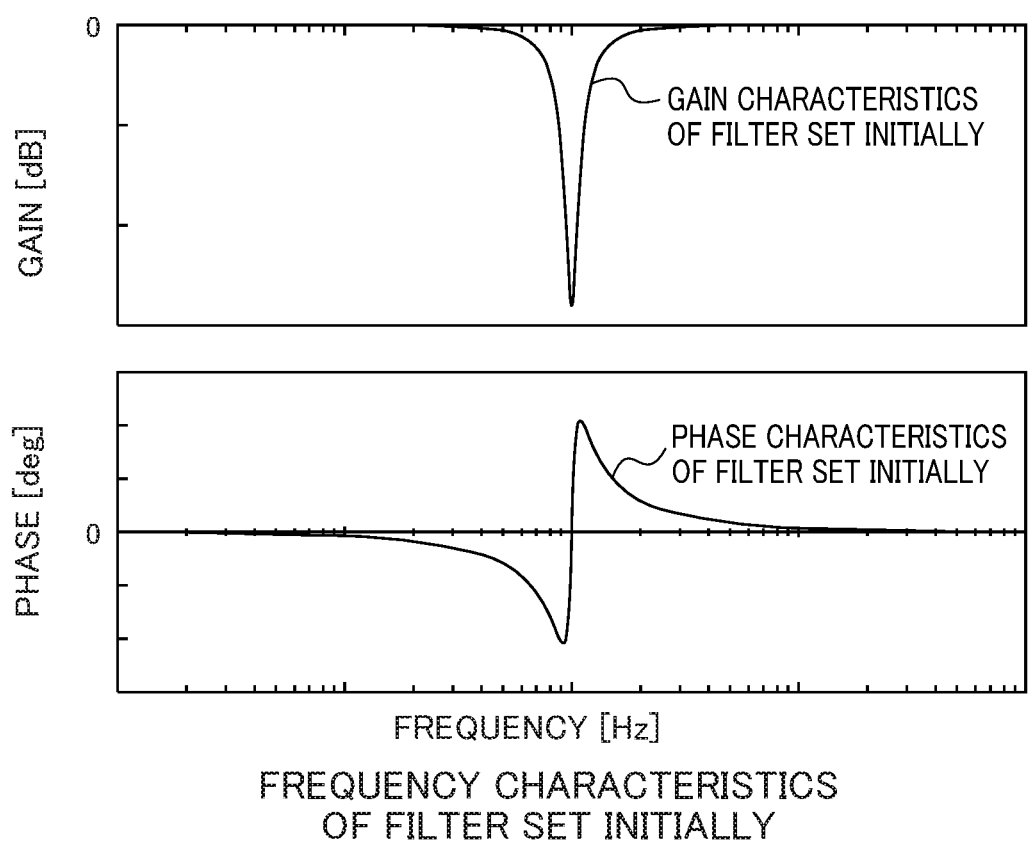
FIG. 4 is a frequency characteristic diagram of a filter set initially.

When there is one resonance point, the frequency characteristics of the filter 130 in which the initial values of the coefficients are set are the frequency characteristics illustrated in FIG. 4.

The frequency characteristic calculation unit 300 calculates the frequency characteristics of the input/output gain and the phase delay using the detection velocity and the velocity command obtained by the servo control unit 11 using the filter 130 in which the coefficients are set by the initial setting unit 500 at or before the start of learning. However, these frequency characteristics are not the frequency characteristics when the filter in which the initial setting was not made by the initial setting unit 500 was used. Therefore, at the start of learning, the machine learning unit 400 obtains the frequency characteristics when the filter characteristics of the filter 130 set by the initial setting unit 500 are removed and performs learning of the coefficients of the filter 130 with respect to the obtained frequency characteristics. After the learning starts, the frequency characteristic calculation unit 300 calculates the frequency characteristics using the detection velocity and the velocity command obtained using the filter 130 in which the coefficients are set by the machine learning unit 400.

The filter characteristics of the filter 130 (an initial filter) in which the coefficients are set by the initial setting unit 500 are removed in the following manner, for example. The servo control unit 100 performs servo control using the filter 130 in which the coefficients are set by the initial setting unit 500 and obtains the detection velocity and the velocity command. The frequency characteristic calculation unit 300 generates a machine model (coefficients $c_i$ and $d_j$ are set such that $0 \leq i \leq m$, $0 \leq j \leq n$, and m and n are natural numbers) of a transfer function $L_1(s)$ of the servo control unit 100 represented by Expression 2 (indicated as 0.2 below) using the detection velocity (an output) and the velocity command (an input) obtained from the servo control unit 100.

$$L_1(s) = \frac{d_0 + d_1 s + d_2 s^2 + \cdots + d_n s^n}{c_0 + c_1 s + c_2 s^2 + \cdots + c_m s^m} \quad \text{[Math. 2]}$$

The frequency characteristic calculation unit 300 substitutes $s = j \cdot \omega$ (j is a complex function) when a frequency $\omega$ [rad] is $2\pi f$ [Hz] to obtain a gain ($|L_1(j\omega)|$) and a phase ($\angle L_1(j\omega)$) and plots the same for each frequency to obtain frequency characteristics.

On the other hand, the machine learning unit 400 stores the transfer function of the filter 130 (an initial filter) set by the initial setting unit 500. The transfer function is a transfer function H(s) represented by Expression 3 (indicated as Math. 3 below), for example. The transfer function H(s) is a transfer function of a notch filter. In Expression 3, a coefficient k is an attenuation coefficient, a coefficient $\omega_c$ is a central angular frequency, and a coefficient $\tau$ is a specific bandwidth. When a central frequency is fc and a bandwidth is fw, the coefficient $\omega_c$ is represented as $\omega_c = 2\pi fc$, and the coefficient $\tau$ is represented as $\tau = fw/fc$. The transfer function H(s) in Expression 3 can be obtained by setting the coefficients $a_i$ and $b_j$ of the transfer function F(s) in Expression 1 such that $a_0$ and $b_0$ are $\omega_c^2$, $a_1$ is $2\omega_c$, $b_1$ is $2k\tau\omega_c$, $a_2$ is 1, $b_2$ is 1, $a_3$ to $a_m$ are 0, and $b_3$ to $b_n$ are 0.

$$H(s) = \frac{s^2 + 2k\tau\omega_c s + \omega_c^2}{s^2 + 2\tau\omega_c s + \omega_c^2} \quad \text{[Math. 3]}$$

The machine learning unit 400 obtains the gain and phase for each frequency using Expression 3 and adds the gain and phase to the frequency characteristics obtained using the machine model of the transfer function $L_1(s)$ to obtain the frequency characteristics from which the filter characteristics of the filter 130 (an initial filter) set by the initial setting unit 500 are removed.

Here, when the transfer function of the servo control unit 100 from which the filter characteristics of the filter 130 set by the initial setting unit 500 are removed is $L_0(s)$, since $L_0(s) + H(s) = L_1(s)$, $L_0(s) = L_1(s) - H(s)$. $s = j \cdot \omega$ (j is a complex function) is substituted when a frequency $\omega$ [rad] is $2\pi f$ [Hz] to obtain a gain ($|L_1(j\omega) - H(j\omega)|$) and a phase ($\angle (L_1(j\omega) - H(j\omega))$) and the same is plotted for each frequency to obtain frequency characteristics.

Figure 5:
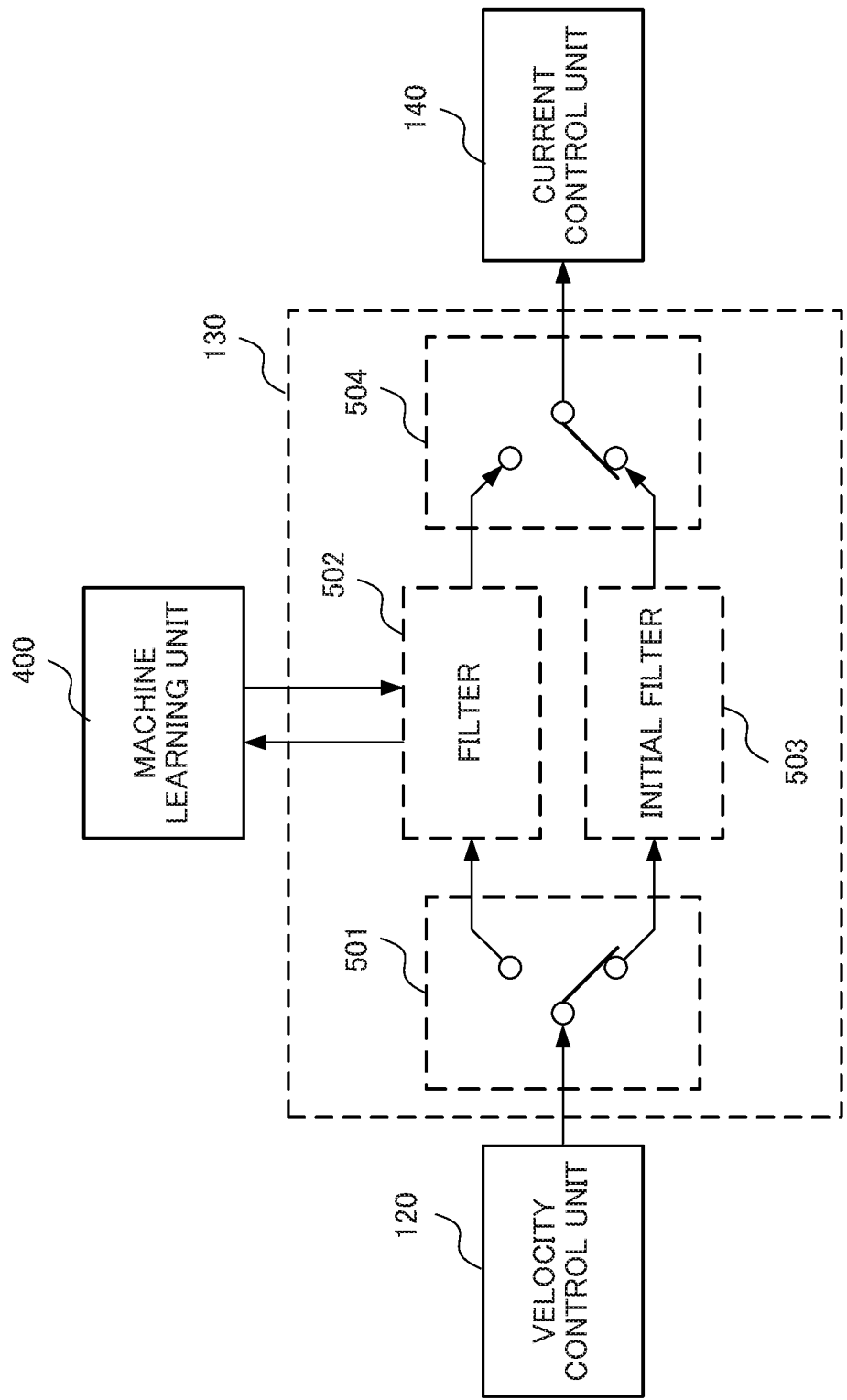
FIG. 5 is a conceptual diagram for describing operations of an initial setting unit and a filter.

Hereinafter, the operations of the initial setting unit 500 and the filter 130 will be described with reference to FIG. 5. FIG. 5 is a conceptual diagram for describing the operations of the initial setting unit 500 and the filter 130. An initial filter 503 illustrated in FIG. 5 corresponds to the filter 130 in which the coefficients are set to initial values, and a filter 502 corresponds to the filter 130 being learned. The coefficients of the initial filter 503 are set like the coefficients of the transfer function H(s) of Expression 3, for example, so as to suppress a resonance frequency. At the start of learning of the machine learning unit 400, the initial filter 503 is connected between the velocity control unit 120 and the current control unit 140 by switching units 501 and 504, and servo control is performed. The frequency characteristic calculation unit 300 calculates the frequency characteristics of the phase delay and the input/output gain using the transfer function $L_1(s)$ in Expression 2 using the detection velocity and the velocity command obtained by the servo control performed using the initial filter 503. After that, the machine learning unit 400 obtains frequency characteristics when the filter characteristics are removed by the transfer function $L_0(s)$ obtained from $L_0(s) = L_1(s) - H(s)$, and performs learning. After learning starts, the filter 502 is connected between the velocity control unit 120 and the current control unit 140 by the switching units 501 and 504, and servo control is performed. In this way, at the start of learning, the initial filter 503 in which the coefficients are set so as to suppress a resonance frequency is used. In the case of the control device 10 illustrated in FIG. 1, the initial filter 503 corresponds to the initial setting unit 500 setting the coefficients for suppressing a resonance frequency as the initial values of the filter 103. If the configuration of FIG. 5 is employed in reality, the number of filters is increased by 1 as compared to the configuration of FIG. 1, and two switching units are inserted, whereby implementation becomes complex and the cost increases. However, if complexity of implementation and increase in cost are allowed, the configuration of FIG. 5 may be employed instead of the configuration of the filter and the initial setting unit illustrated in FIG. 1. Hereinafter, the configuration and operation of the machine learning unit 400 will be described in further detail.

\<Machine Learning Unit 400\>

In the following description, although a case in which the machine learning unit 400 performs reinforcement learning is described, the learning performed by the machine learning unit 400 is not particularly limited to reinforcement learning, but the present invention can be also applied to a case in which the machine learning unit 400 performs supervised learning, for example.

Prior to description of respective functional blocks included in the machine learning unit 400, first, a basic mechanism of reinforcement learning will be described. An agent (corresponding to the machine learning unit 400 in the present embodiment) observes an environment state and selects a certain action. Then, the environment changes on the basis of the action. A certain reward is given according to the environmental change, and the agent learns selection (decision) for a better action. While supervised learning presents a complete correct answer, the reward in the reinforcement learning often presents a fragmental value based on change in a portion of the environment. Therefore, the agent learns to select an action so that the total reward in the future is maximized.

In this way, the reinforcement learning learns a method of learning a suitable action on the basis of the mutual effect of an action on the environment (that is, an action for maximizing the reward to be obtained in the future) by learning an action. This represents that, in the present embodiment, such an action that affects the future, for example, an action of selecting action information for suppressing vibration of a machine end, is obtained.

Here, although any learning method may be used as the reinforcement learning, in the description below, Q-learning which is a method of learning a value function $Q(S,A)$ of selecting an action A under a certain state S of the environment will be described as an example. An object of the Q-learning is to select an action A having the highest value function $Q(S,A)$ as an optimal action among actions A that can be taken in a certain state S.

However, at an initial time at which the Q-learning starts, the correct value of the value $Q(S,A)$ is not known at all for a combination of the state S and the action A.

Therefore, the agent learns the correct value $Q(S,A)$ by selecting various actions A under a certain state S and making a better selection of action based on rewards given for the selected actions A.

Since the agent wants to maximize the total reward obtained over the course of the future, the Q-learning aims to attain a relation of $Q(S,A)=E[\Sigma(\gamma^t)r_t]$ in the end. Here, $E[\ ]$ indicates an expected value, t indicates time, $\gamma$ is a parameter called a discount factor to be described later, $r_t$ is a reward at time t, and $\Sigma$ is the sum at time t. In this expression, the expected value is an expected value when the state was changed according to an optimal action. However, since it is unclear which action would be optimal in the process of Q-learning, reinforcement learning is performed while searching for an optimal action by performing various actions. An updating expression of such a value $Q(S,A)$ can be represented by Expression 4 below (indicated as Math. 4 below)

[Math. 4]
$$Q(S_{t+1}, S_{t+1}) \leftarrow Q(S_t, A_T) + \alpha\left(r_{t+1} + \gamma\max_A Q(S_{t+1}, A) - Q(S_t, A_t)\right)$$

In Expression 4, $S_t$ indicates a state of the environment at time t, and $A_t$ indicates an action at time t. By the action $A_t$, the state changes to $S_{t+1}$. $r_{t+1}$ indicates a reward obtained by the change in the state. Moreover, a term with max is a multiplication of the Q value by $\gamma$ when an action A having the highest Q value known at that moment is selected under the state $S_{t+1}$. Here, $\gamma$ is a parameter of $0<\gamma\le 1$ and is called a discount rate. Moreover, $\alpha$ is a learning coefficient and is in the range of $0<\alpha\le 1$.

Expression 4 indicates a method of updating a value $Q(S_t,A_t)$ of an action $A_t$ in a state $S_t$ based on a reward $r_{t+1}$ that was offered in return when the action $A_t$ was performed.

This updating expression indicates that if the value $\max_a Q(S_{t+1},A)$ of the best action in the next state $S_{t+1}$ associated with an action $A_t$ is larger than the value $Q(S_t,A_t)$ of an action $A_t$ in the state $S_t$, $Q(S_t,A_t)$ is increased, and if otherwise, $Q(S_t,A_t)$ is decreased. That is, the value of a certain action in a certain state approaches the value of the best action in the next state associated with the action. However, although this difference differs depending on the discount rate $\gamma$ and the reward $r_{t+1}$, the value of the best action in a certain state basically propagates to the value of an action in a state previous to that state.

Here, a Q-learning method of creating a value function $Q(S,A)$ table for all state-action pairs $(S,A)$ to perform learning is known. However, it may take a considerably long time for the Q-learning to converge, since the number of states is too large to calculate the $Q(S,A)$ values of all state-action pairs.

Thus, Q-learning may use an existing technique called a deep Q-network (DQN). Specifically, with DQN, the value of the value $Q(S,A)$ is calculated by constructing a value function Q using an appropriate neural network and approximating the value function Q with the appropriate neural network by adjusting the parameters of the neural network. By using DQN, it is possible to shorten the time required for convergence of Q-learning. The details of DQN are disclosed in the Non-Patent Document below, for example.

Non-Patent Document

"Human-level control through deep reinforcement learning", Volodymyr Mnih [online], [searched on Jan. 17, 2017], Internet <URL: http://files.davidqiu.com/research/nature14236.pdf>

The machine learning unit 400 performs the above-described Q-learning. Specifically, the machine learning unit 400 learns a value Q of selecting an action A of adjusting the values of the coefficients $a_i$ and $b_j$ of the transfer function of the filter 130 associated with a state S, wherein the state S includes the values of the coefficients $a_i$ and $b_j$ of the transfer function $F(s)$ of the filter 130 and the input/output gain (the amplitude ratio) and the phase delay output from the frequency characteristic calculation unit 300. At the start of learning, the initial setting unit 500 sets the coefficients $a_i$ and $b_j$ of the transfer function $F(s)$ of the filter 130 to the coefficients of the transfer function $H(s)$ and the machine learning unit 400 removes the filter characteristics of the filter 130 set by the initial setting unit 500 and performs learning. Therefore, the input/output gain (the amplitude ratio) and the phase delay when the filter characteristics were removed serve as the state S.

After the learning starts, the servo control unit 100 performs servo control using the velocity command which is the sinusoidal wave of which the frequency changes on the basis of the coefficients $a_i$ and $b_j$ of the transfer function $F(s)$ of the filter 130 set by the machine learning unit 400. The machine learning unit 400 observes the state information S including the input/output gain (the amplitude ratio) and the phase delay for each frequency, obtained from the frequency characteristic calculation unit 300 by driving the servo control unit 100, to determine the action A. The machine learning unit 400 receives a reward whenever the action A is executed. The machine learning unit 400 searches in trial-and-error manner for the optimal action A so that the total of the reward over the course of the future is maximized. By doing so, the machine learning unit 400 drives the servo control unit 100 using the velocity command which is a sinusoidal wave of which the frequency changes on the basis of the coefficients $a_i$ and $b_j$ of the transfer function F(s) of the filter 130. Moreover, the machine learning unit 400 can select an optimal action A (that is, the optimal coefficients $a_i$ and $b_j$ of the transfer function F(s) of the filter 130) with respect to the state S including the input/output gain (the amplitude ratio) and the phase delay for each frequency, obtained from the frequency characteristic calculation unit 300.

That is, the machine learning unit 400 selects such an action A that maximizes the value of Q among the actions A applied to the coefficients $a_i$ and $b_j$ of the transfer function of the filter 130 associated with a certain state S on the basis of the learned value function Q. By doing so, the machine learning unit 400 can select such an action A (that is, the coefficients $a_i$ and $b_j$ of the transfer function of the filter 130) that minimizes the vibration of a machine end generated when a machining program is executed.

Figure 6:
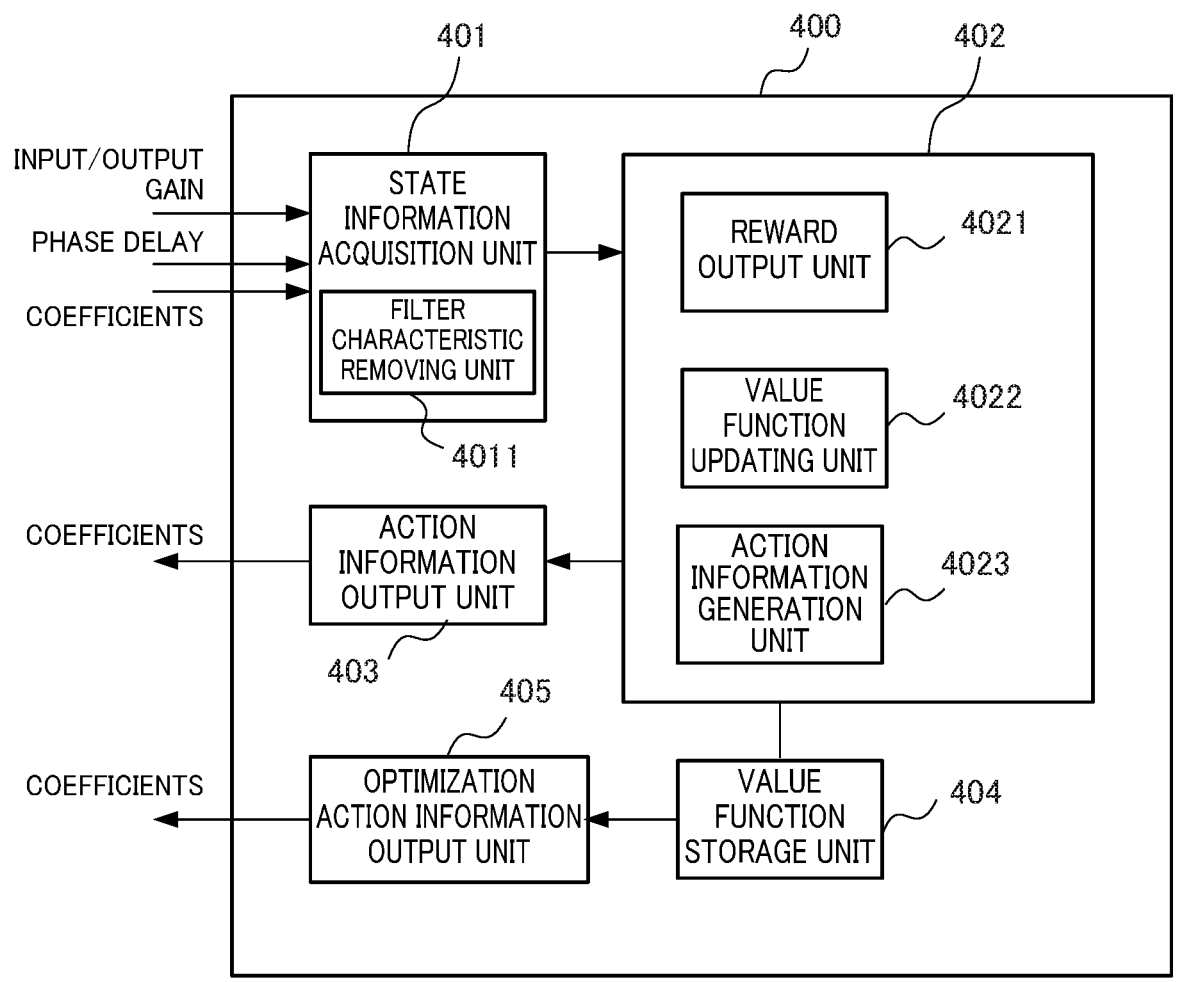
FIG. 6 is a block diagram illustrating a machine learning unit according to an embodiment.

FIG. 6 is a block diagram illustrating the machine learning unit 400 according to an embodiment. As illustrated in FIG. 6, in order to perform the reinforcement learning described above, the machine learning unit 400 includes a state information acquisition unit 401, a learning unit 402, an action information output unit 403, a value function storage unit 404, and an optimization action information output unit 405.

Figure 7:
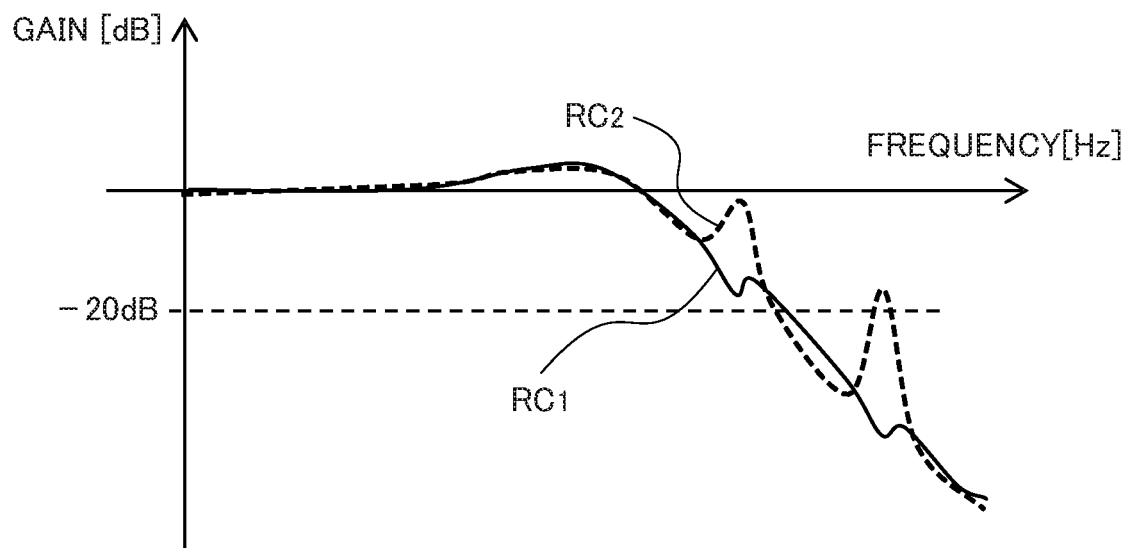
FIG. 7 is a frequency characteristic diagram illustrating examples of frequency characteristics to which filter characteristics are added and frequency characteristics from which filter characteristics are excluded.

The state information acquisition unit 401 includes a filter characteristic removing unit 4011. The transfer function H(s) of the filter 130 set by the initial setting unit 500 is stored in the filter characteristic removing unit 4011. At or before the start of learning, the initial setting unit 500 sets the transfer function of the filter 130 to the transfer function H(s). The frequency characteristic calculation unit 300 calculates the frequency characteristics of the input/output gain (the amplitude ratio) and the phase delay according to the transfer function $L_1(s)$ of the servo control unit 100 using the detection velocity and the velocity command obtained using the filter 130 of the transfer function H(s). The frequency characteristics are not the frequency characteristics when the filter 130 in which the initial setting was not performed by the initial setting unit 500 was used. Therefore, at the start of learning, the state information acquisition unit 401 obtains the frequency characteristics of the input/output gain (the amplitude ratio) and the phase delay when the filter characteristics of the filter 130 of the transfer function H(s) are removed according to the transfer function $L_0(s)$ ($L_0(s)=L_1(s)-H(s)$) using the filter characteristic removing unit 4011. The frequency characteristics serve as the state S. For example, FIG. 7 illustrates examples of the frequency characteristics to which filter characteristics are added and the frequency characteristics from which the filter characteristics are removed. In FIG. 7, a curve $RC_1$ indicates the frequency characteristics of the servo control unit 100 to which the filter characteristics are added and a curve $RC_2$ indicates the frequency characteristics of the servo control unit 100 from which the filter characteristics are removed. The filter characteristic removing unit 4011 may be provided in the frequency characteristic calculation unit 300 rather than in the state information acquisition unit 401 of the machine learning unit 400.

During learning after the start of the learning, the state information acquisition unit 401 acquires, from the frequency characteristic calculation unit 300, the state S including the input/output gain (the amplitude ratio) and the phase delay obtained by driving the servo motor 150 using the velocity command (a sinusoidal wave) on the basis of the coefficients $a_i$ and $b_j$ of the transfer function F(s) of the filter 130 set by the machine learning unit 400. The input/output gain is the input/output gain calculated using the transfer function L(s) of the servo control unit 100 having the filter of the transfer function F(s) after the start of the learning. The frequency characteristic calculation unit 300 generates a machine model of the transfer function L(s) of the servo control unit 100 using the detection velocity (the output) and the velocity command (the input) obtained from the servo control unit 100. The state S corresponds to an environment state S in the Q-learning. The state information acquisition unit 401 outputs the acquired state S to the learning unit 402.

The learning unit 402 is a unit that learns the value Q(S,A) when a certain action A is selected under a certain environment state S. The learning unit 402 includes a reward output unit 4021, a value function updating unit 4022, and an action information generation unit 4023.

The reward output unit 4021 is a unit that calculates a reward when the action A is selected under a certain state S. The reward output unit 4021 compares the input/output gain G calculated when the coefficients $a_i$ and $b_j$ of the transfer function F(s) of the filter 130 were corrected with the input/output gains Gb of the respective frequencies of a standard model set in advance. The input/output gain G is the input/output gain calculated using the transfer function L(s) of the servo control unit 100. The reward output unit 4021 outputs a negative reward when the calculated input/output gain G is larger than the input/output gain Gb of the standard model. On the other hand, when the calculated input/output gain G is equal to or smaller than the input/output gain Gb of the standard model, the reward output unit 4021 outputs a positive reward when the phase delay decreases, outputs a negative reward when the phase delay increases, and outputs a zero reward when the phase delay does not change.

Figure 8:
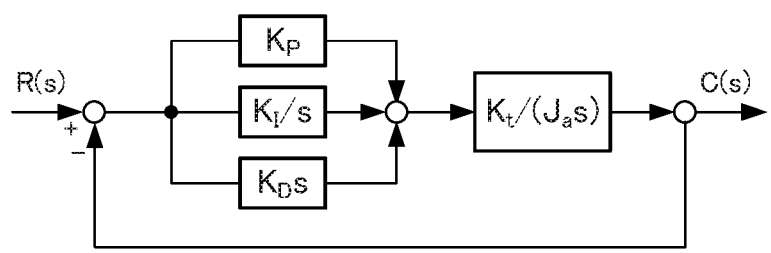
FIG. 8 is a block diagram serving as a model for calculating a standard model of an input/output gain.

First, an operation of the reward output unit 4021 outputting a negative reward when the calculated input/output gain G is larger than the input/output gain Gb of the standard model will be described with reference to FIGS. 8 and 9. The reward output unit 4021 stores the standard model of the input/output gain. A standard model is a model of a servo control unit having ideal characteristics without resonance. The standard model can be calculated from inertia Ja, a torque constant $K_t$, a proportional gain $K_P$, an integral gain $K_I$, and a differential gain $K_D$ of the model illustrated in FIG. 8, for example. The inertia Ja is an addition value of a motor inertia and a machine inertia.

Figure 9:
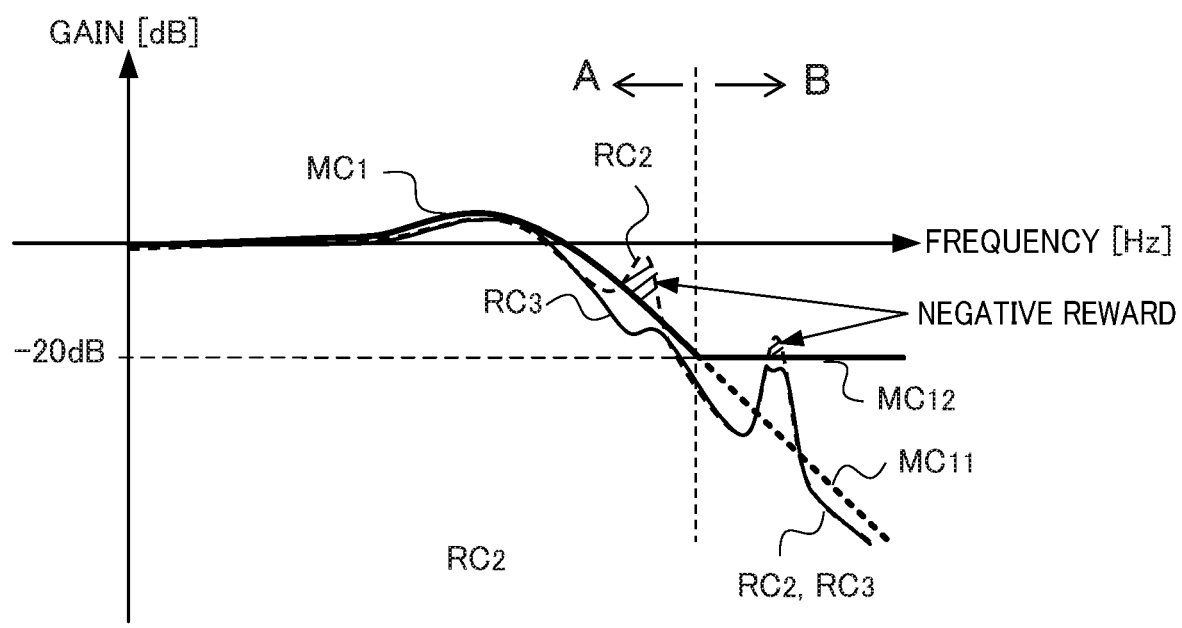
FIG. 9 is a characteristic diagram illustrating the frequency characteristics of an input/output gain of a servo control unit of a standard model and a servo control unit before and after learning.

FIG. 9 is a characteristic diagram illustrating the frequency characteristics of the input/output gains of a servo control unit of a standard model and the servo control unit 100 before and after learning. As illustrated in the characteristic diagram of FIG. 9, the standard model has a region A which is a frequency region in which an input/output gain is equal to or larger than a certain input/output gain (for example, an ideal input/output gain of −20 dB) and a region B which is a frequency region in which an input/output gain is smaller than the certain input/output gain. In the region A of FIG. 9, an ideal input/output gain of the standard model is indicated by a curve $MC_1$ (a bold line). In the region B of FIG. 9, an ideal imaginary input/output gain of the standard model is indicated by a curve $MC_{11}$ (a bold broken line) and the input/output gain of the standard model is indicated by a straight line $MC_{12}$ (a bold line) as a constant value. In the regions A and B of FIG. 9, the curves of the input/output gains of the servo control unit before and after learning are indicated by curves $RC_2$ and $RC_3$.

In the region A, the reward output unit 4021 outputs a first negative reward when the curve $RC_2$ of the calculated input/output gain exceeds the curve $MC_1$ of the ideal input/output gain of the standard model. In the region B exceeding a frequency at which the input/output gain becomes sufficiently small, the influence on stability is small even when the curve $RC_2$ of the input/output gain exceeds the curve $MC_{11}$ of the ideal imaginary input/output gain of the standard model. Therefore, in the region B, as described above, the input/output gain of the standard model uses the straight line $MC_{12}$ of the input/output gain (for example, −20 dB) of the constant value rather than the curve $MC_{11}$ of the ideal gain characteristics. However, the first negative value is output as a reward since there is a possibility of becoming unstable when the curve $RC_2$ of the calculated input/output gain before learning exceeds the straight line $MC_{12}$ of the input/output gain of the constant value.

Next, an operation of the reward output unit 4021 determining a reward on the basis of the phase delay information when the calculated input/output gain G is equal to or smaller than the input/output gain Gb of the standard model will be described. In the following description, a phase delay which is a state variable related to the state information S will be defined as D(S), and a phase delay which is a state variable related to a state S' changed from the state S by the action information A (corrections of the coefficients $a_i$ and $b_j$ of the transfer function F(s) of the filter 130) will be defined as D(S').

The following three methods may be used, for example, as a method for the reward output unit 4021 determining a reward on the basis of the phase delay information. A first method is a method of determining a reward on the basis of whether a frequency at which the phase delay is 180° will increase, decrease, or remain the same when the state S changes to the state S'. In this example, although a case where the phase delay is 180° is employed, the angle is not particularly limited to 180° but another value may be used. For example, when a phase delay is represented as a phase diagram illustrated in FIG. 3, and the state S changes to the state S', the phase delay increases if the curve changes (in the direction $X_2$ in FIG. 3) so that the frequency at which the phase delay is 180° decreases. On the other hand, when the state S changes to the state S', the phase delay decreases if the curve changes (in the direction $X_1$ in FIG. 3) so that the frequency at which the phase delay is 180° increases.

Therefore, when the state S changes to the state S' and the frequency at which the phase delay is 180° decreases, it is defined that the phase delay D(S)<phase delay D(S'), and the reward output unit 4021 sets the reward to a second negative value. The absolute value of the second negative value is smaller than that of the first negative value. On the other hand, when the state S changes to the state S' and the frequency at which the phase delay is 180° increases, it is defined that phase delay D(S)>phase delay D(S'), and the reward output unit 4021 sets the reward to a positive value. Moreover, when the state S changes to the state S' and the frequency at which the phase delay is 180° remains the same, it is defined that phase delay D(S)=phase delay D(S'), and the reward output unit 4021 sets the reward to zero.

A second method is a method of determining a reward on the basis of whether an absolute value of a phase delay when the input/output gain crosses 0 dB will increase, decrease, or remain the same when the state S changes to the state S'. For example, in the state S, when the input/output gain is represented as a gain diagram illustrated in FIG. 3, a phase delay of the phase diagram illustrated in FIG. 3 corresponding to a point (hereinafter referred to as a "zero-cross point") crossing 0 dB is −90°.

When the state S changes to the state S' and the absolute value of the phase delay at the zero-cross point increases, it is defined that the phase delay D(S)<phase delay D(S'), and the reward output unit 4021 sets the reward to a second negative value. On the other hand, when the state S changes to the state S' and the absolute value of the phase delay at the zero-cross point decreases, it is defined that the phase delay D(S)>phase delay D(S'), and the reward output unit 4021 sets the reward to a positive value. Moreover, when the state S changes to the state S' and the absolute value of the phase delay at the zero-cross point remains the same, it is defined that the phase delay D(S)=phase delay D(S'), and the reward output unit 4021 sets the reward to zero.

A third method is a method of determining a reward on the basis of whether a phase margin will increase, decrease, or remain the same when the state S changes to the state S'. A phase margin indicates an angular distance of a phase from 1800 when the gain is 0 dB. For example, in FIG. 3, since the phase is −90° when the gain is 0 dB, the phase margin is 90°. When the state S changes to the state S' and the phase margin decreases, it is defined that the phase delay D(S) <phase delay D(S'), and the reward output unit 4021 sets the reward to a second negative value. On the other hand, when the state S changes to the state S' and the phase margin increases, it is defined that the phase delay D(S)>phase delay D(S'), and the reward output unit 4021 sets the reward to a positive value. Moreover, when the state S changes to the state S' and the phase margin is not changed, it is defined that the phase delay D(S)=phase delay D(S'), and the reward output unit 4021 sets the reward to zero.

Furthermore, the negative value when it is defined that the phase delay D(S') of the state S' after execution of the action A is larger than the phase delay D(S) of the previous state S may increase according to a proportion. For example, in the first method, the negative value may increase according to the degree of decrease in frequency. In contrast, the positive value when it is defined that the phase delay D(S') of the state S' after execution of the action A is smaller than the phase delay D(S) of the previous state S may increase according to a proportion. For example, in the first method, the positive value may increase according to the degree of increase in frequency.

The value function updating unit 4022 updates the value function Q stored in the value function storage unit 404 by performing Q-learning on the basis of the state S, the action A, the state S' when the action A was applied to the state S, and the value of the reward calculated in this manner. The update of the value function Q may be performed by online learning, batch learning, or mini-batch learning. Online learning is a learning method of applying a certain action A to a present state S and updating the value function Q immediately whenever the present state S transitions to a new state S'. Batch learning is a learning method of applying a certain action A to a present state S and repeatedly attaining transition from the state S to a new state S', collecting learning data, and updating the value function Q using all the collected learning data. Mini-batch learning is a learning method which is intermediate between online learning and batch learning and involves updating the value function Q whenever a certain amount of learning data is collected.

The action information generation unit 4023 selects the action A in the process of Q-learning with respect to the present state S. The action information generation unit 4023 generates action information A and outputs the generated action information A to the action information output unit 403 in order to perform an operation (corresponding to the action A of Q-learning) of correcting the coefficients $a_i$ and $b_j$ of the transfer function F(s) of the filter 130 in the process of Q-learning. More specifically, the action information generation unit 4023 adds or subtracts the coefficients $a_i$ and $b_j$ of the transfer function F(s) of the filter 130 included in the action A incrementally with respect to the coefficients $a_i$ and $b_j$ of the transfer function F(s) of the filter 130 included in the state S, for example.

When the coefficients $a_i$ and $b_j$ of the transfer function F(s) of the filter 130 are increased or decreased, the state S transitions to the state S', and a plus reward (a positive reward) is offered in return, the action information generation unit 4023 may select a policy of selecting such an action A' that further decreases the calculated phase delay to be smaller than the previous phase delay such as incrementally increasing or decreasing the coefficients $a_i$ and $b_j$ of the transfer function F(s) of the filter 130 similarly to the previous action as the next action A'.

In contrast, when a minus reward (a negative reward) is offered in return, the action information generation unit 4023 may select a policy of selecting such an action A' that further decreases the difference in input gain to be smaller than the previous difference when the calculated input/output gain is larger than the input/output gain of the standard model or further decreases the calculated phase delay to be smaller than the previous phase delay such as incrementally decreasing or increasing the coefficients $a_i$ and $b_j$ of the transfer function F(s) of the filter 130 contrarily to the previous action as the next action A', for example.

Figure 10:
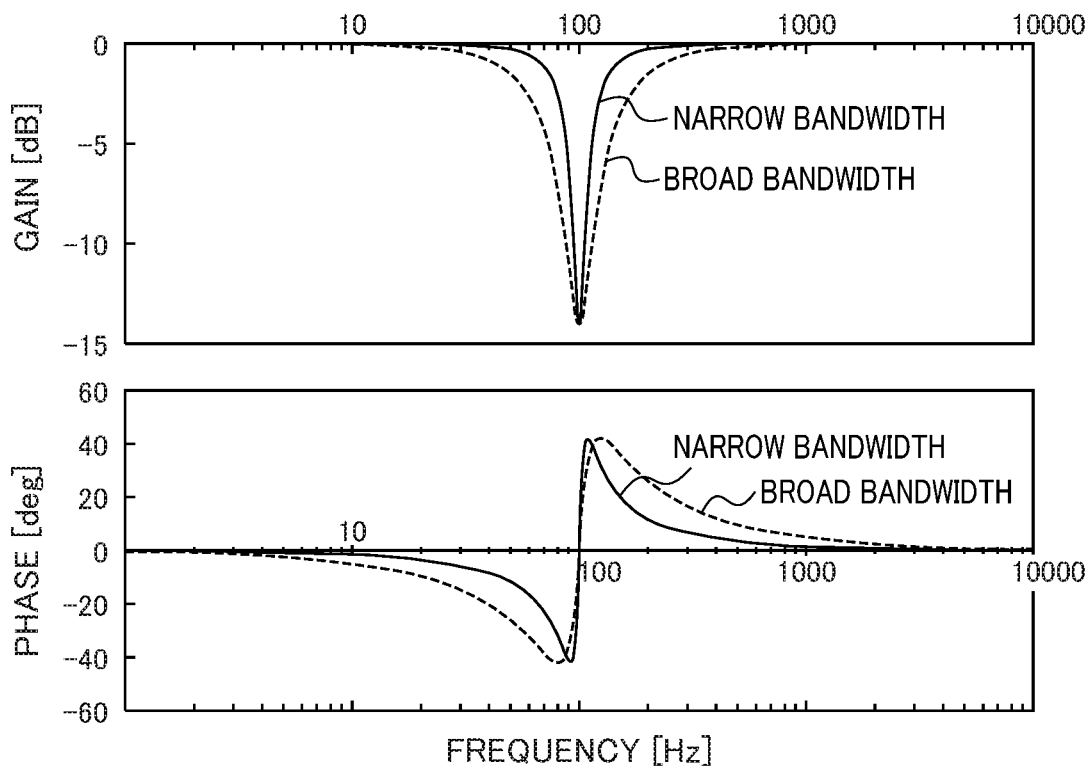
FIG. 10 is a characteristic diagram illustrating a relation between a bandwidth of a filter and a gain and a phase.
Figure 11:
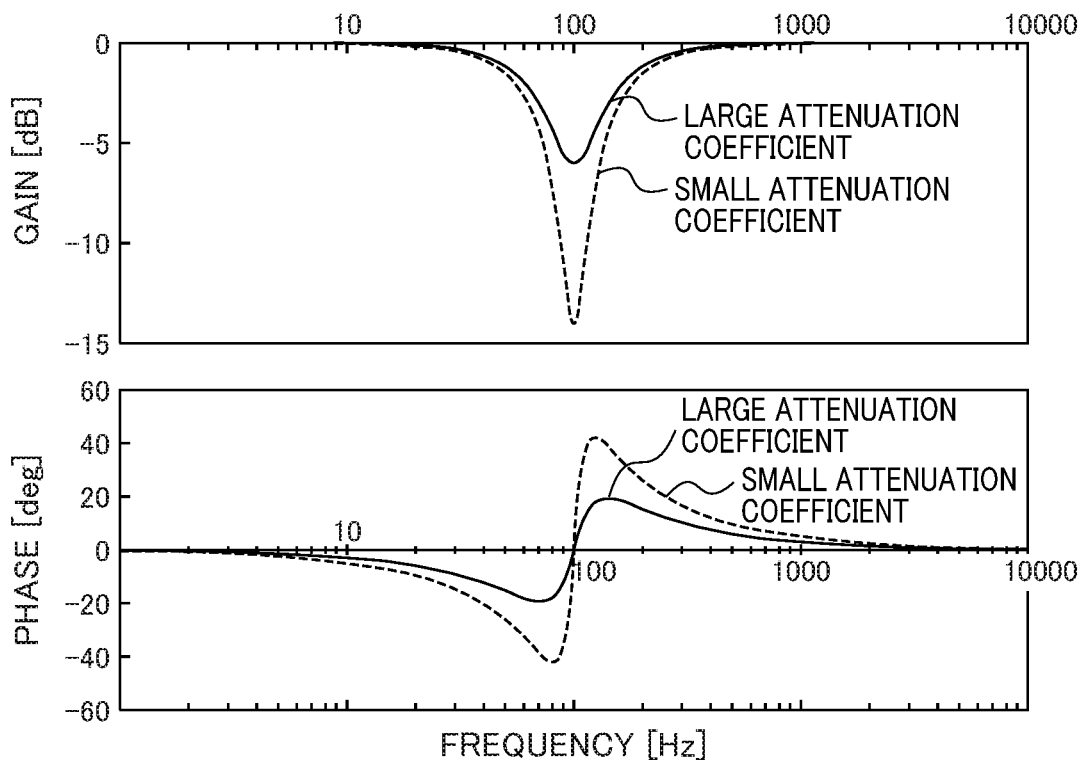
FIG. 11 is a characteristic diagram illustrating a relation between an attenuation coefficient of a filter and a gain and a phase.

All of the coefficients $a_i$ and $b_j$ may be corrected and some coefficients may be corrected. For example, when the transfer function F(s) of the filter 130 is learned as the transfer function of such a notch filter as illustrated in Expression 3, it is easy to find the central frequency fc at which resonance occurs and it is easy to specify the central frequency fc. Therefore, the action information generation unit 4023 may perform an operation of temporarily fixing the central frequency fc and correcting the bandwidth fw and the attenuation coefficient k (that is, fixing the coefficient $\omega_c$ (=2πfc) and correcting the coefficient τ (=fw/fc) and the attenuation coefficient k). Specifically, the coefficients $a_i$ and $b_j$ of the transfer function F(s) in Expression 1 are set such that $a_0$ and $b_0$ are $\omega c_2$, $a_1$ is $2\tau\omega_c$, $b_1$ is $2k\tau\omega_c$, $a_2$ is 1, $b_2$ is 1, $a_3$ to $a_m$ are 0, and $b_3$ to $b_n$ are 0. In this case, $a_0$ and $b_0$ may be fixed, the action information A may be generated so as to correct $a_1$ and $b_1$, and the generated action information A may be output to the action information output unit 403. As illustrated in FIG. 10, the characteristics (such as a gain and a phase) of the filter 130 change depending on the bandwidth fw of the filter 130. In FIG. 10, a broken line indicates a case where the bandwidth fw is large, and a solid line indicates a case where the bandwidth fw is small. Moreover, as illustrated in FIG. 11, the characteristics (such as a gain and a phase) of the filter 130 change depending on the attenuation coefficient k of the filter 130. In FIG. 11, a broken line indicates a case where the attenuation coefficient k is small, and a solid line indicates a case where the attenuation coefficient k is large.

The action information generation unit 4023 may select a policy of selecting the action A' according to a known method such as a greedy method of selecting an action A' having the highest value function Q(S,A) among the values of presently estimated actions A and an ε-greedy method of randomly selecting an action A' with a certain small probability E and selecting an action A' having the highest value function Q(S,A) in other cases.

The action information output unit 403 is a unit that transmits the action information A output from the learning unit 402 to the filter 130. As described above, the filter 130 finely adjusts the present state S (that is, the coefficients $a_i$ and $b_j$ set presently) on the basis of the action information to thereby transition to the next state S' (that is, the corrected coefficients of the filter 130).

The value function storage unit 404 is a storage device that stores the value function Q. The value function Q may be stored as a table (hereinafter referred to as an action value table) for each sate S and each action A, for example. The value function Q stored in the value function storage unit 404 is updated by the value function updating unit 4022. Moreover, the value function Q stored in the value function storage unit 404 may be shared with other machine learning units 400. When the value function Q is shared by a plurality of machine learning units 400, since reinforcement learning can be performed in a manner of being distributed to the respective machine learning units 400, it is possible to improve the reinforcement learning efficiency.

The optimization action information output unit 405 generates the action information A (hereinafter referred to as "optimization action information") for causing the filter 130 to perform an operation of maximizing the value Q(S,A) on the basis of the value function Q updated by the value function updating unit 4022 performing the Q-learning. More specifically, the optimization action information output unit 405 acquires the value function Q stored in the value function storage unit 404. As described above, the value function Q is updated by the value function updating unit 4022 performing the Q-learning. The optimization action information output unit 405 generates the action information on the basis of the value function Q and outputs the generated action information to the filter 130. The optimization action information includes information that corrects the coefficients $a_i$ and $b_j$ of the transfer function of the filter 130 similarly to the action information that the action information output unit 403 outputs in the process of Q-learning.

In the filter 130, the coefficients $a_i$ and $b_j$ of the transfer function F(s) are corrected on the basis of the action information. With the above-described operations, the machine learning unit 400 can optimize the coefficients $a_i$ and $b_j$ of the transfer function F(s) of the filter 130 and operate so that vibration of a machine end is suppressed. As described above, it is possible to simplify adjustment of the parameters of the filter 130 using the machine learning unit 400 according to the present invention.

Hereinabove, the functional blocks included in the control device 10 have been described. In order to realize these functional blocks, the control device 10 includes an arithmetic processing unit such as a central processing unit (CPU). The control device 10 further includes an auxiliary storage device such as a hard disk drive (HDD) for storing various control programs such as application software or an operating system (OS) and a main storage device such as a random access memory (RAM) for storing data temporarily required when the arithmetic processing device executes a program.

In the control device 10, the arithmetic processing device reads an application and an OS from the auxiliary storage device, and develops the read application software and OS in the main storage device to perform arithmetic processing on the basis of the read application software and OS. The arithmetic processing device also controls various types of hardware provided in each device based on the arithmetic result. In this way, the functional blocks of the present embodiment are realized. That is, the present embodiment can be realized by cooperation of hardware and software.

Since the machine learning unit 400 involves a large amount of computation associated with the machine learning, graphics processing units (GPUs) may be mounted on a personal computer and be used for arithmetic processing associated with the machine learning using a technique called general-purpose computing on graphics processing units (GPGPUs). In this way, high velocity processing can be performed. Furthermore, in order for the machine learning unit 400 to perform higher velocity processing, a computer cluster may be built using a plurality of computers equipped with such GPUs, and the plurality of computers included in the computer cluster may perform parallel processing.

Figure 12:
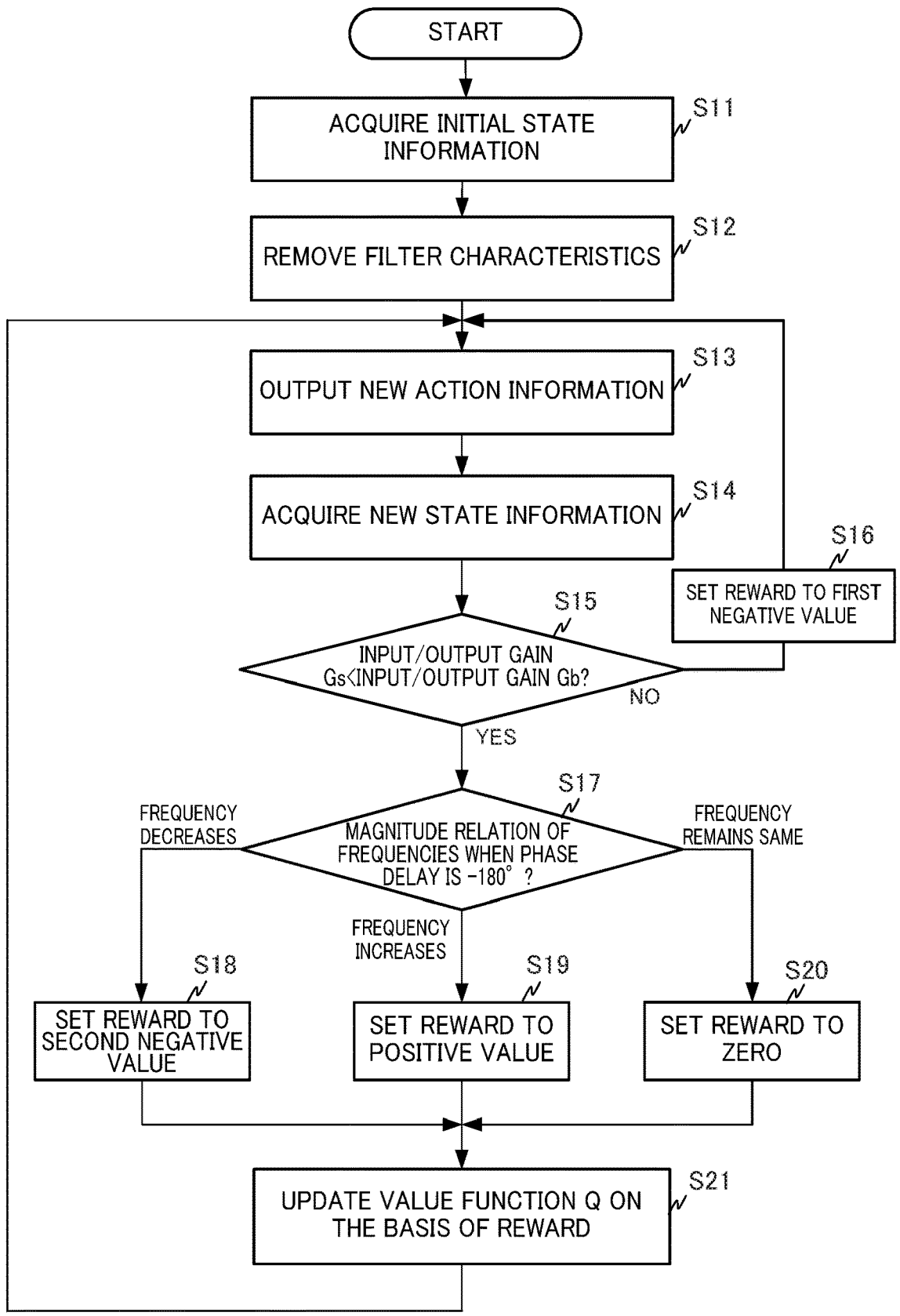
FIG. 12 is a flowchart illustrating an operation of a machine learning unit during Q-learning according to the present embodiment.

Next, an operation of the machine learning unit 400 during Q-learning according to the present embodiment will be described with reference to the flowcharts of FIG. 12.

In step S11, the state information acquisition unit 401 acquires the initial state information S from the servo control unit 100 and the frequency characteristic calculation unit 300.

The input/output gain (the amplitude ratio) $G(S_0)$ and the phase delay $D(S_0)$ in the state $S_0$ at a time point at which Q-learning starts initially are obtained from the frequency characteristic calculation unit 300 by driving the servo control unit 100 in which the transfer function of the filter 130 is the transfer function H(s) using the velocity command which is a sinusoidal wave of which the frequency changes. The velocity command and the detection velocity are input to the frequency characteristic calculation unit 300, and the input/output gain (the amplitude ratio) $G(S_0)$ and the phase delay $D(S_0)$ output from the frequency characteristic calculation unit 300 are input to the state information acquisition unit 401 as initial state information. The frequency characteristic calculation unit 300 calculates the input/output gain (the amplitude ratio) $G(S_0)$ and the phase delay $D(S_0)$ on the basis of the transfer function $L_1(s)$ illustrated in Expression 2 of the servo control unit 100 in the state $S_0$. The coefficients $\omega_c$, $\tau$, and k of the transfer function H(s) of the filter 130 set by the initial setting unit 500 are transmitted to the state information acquisition unit 401 as initial state information. As described above, the transfer function H(s) in Expression 3 can be obtained by setting the coefficients $a_i$ and $b_j$ of the transfer function F(s) in Expression 1 such that $a_0$ and $b_0$ are $\omega c_2$, $a_1$ is $2\tau\omega_c$, $b_1$ is $2k\tau\omega_c$, $a_2$ is 1, $b_2$ is 1, $a_3$ to $a_m$ are 0, and $b_3$ to $b_n$ are 0. In step S12, the state information acquisition unit 401 obtains the frequency characteristics of the phase delay and the input/output gain (the amplitude ratio) in the state $S_0$ when the filter characteristics of the filter 130 set by the initial setting unit 500 were removed using the filter characteristic removing unit 4011. The obtained input/output gain (the amplitude ratio) and the phase delay are output to the reward output unit 4021 and the action information generation unit 4023. As described above, the state information S is information corresponding to the state of Q-learning.

In step S13, the action information generation unit 4023 generates new action information A and outputs the generated new action information A to the filter 130 via the action information output unit 403. The action information generation unit 4023 outputs the new action information A on the basis of the above-described policy. The servo control unit 100 having received the action information A drives the servo motor 150 using the velocity command which is the sinusoidal wave of which the frequency changes according to the state S' obtained by correcting the coefficients $a_i$ and $b_j$ of the transfer function F(s) of the filter 130 associated with the present state S on the basis of the received action information. As described above, the action information corresponds to the action A in Q-learning. The coefficients $a_i$ and $b_j$ of the transfer function F(s) of the filter 130 in the state $S_0$ at the start of learning are set to the coefficients of the transfer function H(s), and in the next state S' after the state $S_0$ at the start of learning, the action information generation unit 4023 corrects the coefficients $a_i$ and $b_j$ of the transfer function F(s) from the coefficients of the transfer function H(s).

In step S14, the state information acquisition unit 401 acquires the input/output gain (the amplitude ratio) G(S') and the phase delay D(S') in the new state S' and the coefficients $a_i$ and $b_j$ of the transfer function F(s) from the filter 130 as new state information. The acquired new state information is output to the reward output unit 4021.

In step S15, the reward output unit 4021 determines whether the input/output gain G(S') of each frequency in the state S' are equal to or smaller than the input/output gain Gb of each frequency of the standard model. When the input/output gain G(S') of each frequency is larger than the input/output gain Gb of each frequency of the standard model (step S15: NO), the reward output unit 4021 sets the reward to a first negative value in step S16 and returns to step S13.

When the input/output gain G(S') of each frequency in the state S' is equal to or smaller than the input/output gain Gb of each frequency of the standard model (step S15: YES), the reward output unit 4021 outputs a positive reward when the phase delay D(S') is smaller than the phase delay D(S), outputs a negative value when the phase delay D(S') is larger than the phase delay D(S), and outputs a zero reward when the phase delay D(S') remains the same as the phase delay D(S). As described above, although three methods, for example, may be used as a method for determining the reward so that the phase delay decreases as described above, a case in which the first method is adopted will be described. The state S serves as the state $S_0$ at the start of learning. In step S17, specifically, when the state S changes to the state S' in the phase diagram in FIG. 3, for example, and the frequency at which the phase delay is 180° decreases, it is defined that phase delay D(S)<phase delay D(S'), and the reward output unit 4021 sets the reward to a second negative value in step S18. The absolute value of the second negative value is smaller than that of the first negative value. When the state S changes to the state S' and the frequency at which the phase delay is 180° increases, it is defined that phase delay D(S)>phase delay D(S'), and the reward output unit 4021 sets the reward to a positive value in step S19. Moreover, when the state S changes to the state S' and the frequency at which the phase delay is 180° remains the same, it is defined that phase delay D(S)=phase delay D(S'), and the reward output unit 4021 sets the reward to zero in step S20.

When any one of steps S18, S19, and S20 ends, the value function updating unit 4022 updates the value function Q stored in the value function storage unit 404 on the basis of the value of the reward calculated in any one of the steps in step S21. After that, the flow returns to step S11 again, and the above-described process is repeated, whereby the value function Q settles to an appropriate value. The process may end on condition that the above-described process is repeated a predetermined number of times or for a predetermined period. Although online updating is exemplified in step S21, batch updating or mini-batch updating may be performed instead of the online updating.

In the present embodiment, due to the operations described with reference to FIG. 12, the use of the machine learning unit 400 provides an advantage that it is possible to obtain an appropriate value function for adjustment of the coefficients $a_i$ and $b_j$ of the transfer function F(s) of the filter 130 and to simplify optimization of the coefficients $a_i$ and $b_j$ of the transfer function F(s) of the filter 130. Next, an operation during generation of the optimization action information by the optimization action information output unit 405 will be described with reference to the flowchart of FIG. 13. First, in step S21, the optimization action information output unit 405 acquires the value function Q stored in the value function storage unit 404. As described above, the value function Q is updated by the value function updating unit 4022 performing the Q-learning.

In step S22, the optimization action information output unit 405 generates the optimization action information on the basis of the value function Q and outputs the generated optimization action information to the filter 130.

Figure 13:
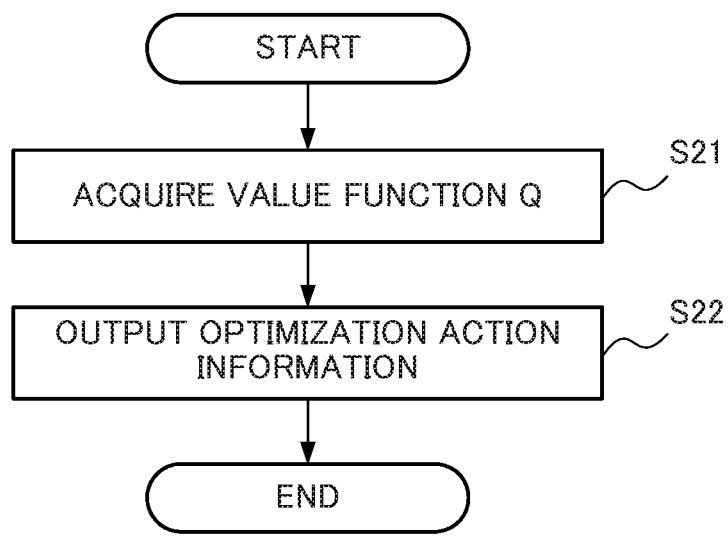
FIG. 13 is a flowchart illustrating an operation of an optimization action information output unit of a machine learning unit according to an embodiment.

In the present embodiment, due to the operations described with reference to FIG. 13, it is possible to generate the optimization action information on the basis of the value function Q obtained by the learning of the machine learning unit 400, simplify adjustment of the coefficients $a_i$ and $b_j$ of the transfer function F(s) of the filter 130 set presently on the basis of the optimization action information, suppress vibration of a machine end, and improve the quality of a machining surface of a work.

The components included in the control device may be realized by hardware, software or a combination thereof. The servo control method performed by cooperation of the components included in the control device described above also may be realized by hardware, software, or a combination thereof. Here, being realized by software means being realized when a computer reads and executes a program.

The programs can be stored on any of various types of non-transitory computer readable media and be provided to a computer. The non-transitory computer readable media include various types of tangible storage media. Examples of the non-transitory computer readable media include a magnetic recording medium (for example a hard disk drive), a magneto-optical recording medium (for example a magneto-optical disk), a CD-ROM (Read Only Memory), a CD-R, a CD-R/W, a semiconductor memory (for example a mask ROM, a PROM (Programmable ROM), an EPROM (Erasable PROM), a flash ROM, and a RAM (Random Access Memory)). Moreover, the programs may be supplied to a computer via various types of transitory computer readable media.

The above-described embodiment is a preferred embodiment of the present invention. However, the scope of the present invention is not limited to the embodiment only, and the present invention can be embodied in various modifications without departing from the spirit of the present invention.

Figure 14:
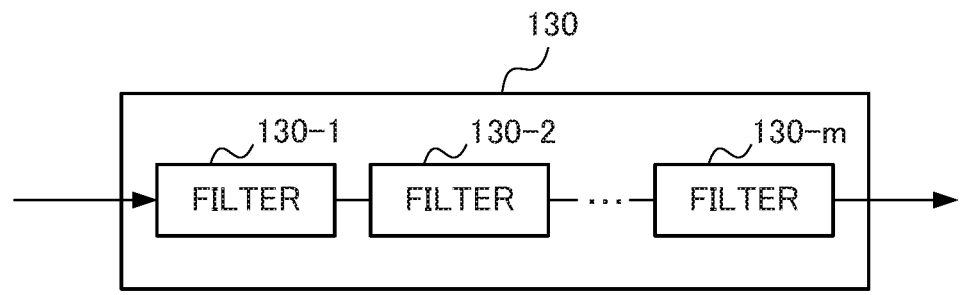
FIG. 14 is a block diagram illustrating an example in which a plurality of filters are connected directly to form a filter.

In the above-described embodiment, although a case in which the machine driven by the servo motor 150 has one resonance point has been described, the machine may have a plurality of resonance points. When the machine has a plurality of resonance points, a plurality of filters may be provided so as to correspond to the respective resonance points and be connected in series whereby all resonances can be attenuated. FIG. 14 is a block diagram illustrating an example in which a plurality of filters are connected in series to form a filter. In FIG. 14, when there are m (m is a natural number of 2 or more) resonance points, the filter 130 is formed by connecting m filters 130-1 to 130-m in series. Optimal values for attenuating resonance points are calculated by performing machine learning sequentially with respect to the coefficients $a_i$ and $b_j$ of the m filters 130-1 to 130-m.

In the above-described embodiment, an example in which the frequency characteristic calculation unit calculates both the input/output gain and the input/output phase delay of the servo control device on the basis of the input signal and the output signal of the servo control device, of which the frequencies change, the filter characteristic removing unit removes the filter characteristics of the initial filter from both the input/output gain and the input/output phase delay, and the machine learning unit starts machine learning of the coefficients of the filter in which the filter characteristics of the initial filter are removed so that both the input/output gain and the phase delay decrease has been described. However, in the above-described embodiment, the frequency characteristic calculation unit may calculate one of the input/output gain and the input/output phase delay of the servo control device on the basis of the input signal and the output signal of the servo control device, of which the frequencies change, the filter characteristic removing unit may remove the filter characteristics of the initial filter from one of the input/output gain and the input/output phase delay, and the machine learning unit may start machine learning of the coefficients of the filter in which the filter characteristics of the initial filter are removed so that one of the input/output gain and the phase delay decreases.

The control device may have the following configuration other than the configuration illustrated in FIG. 1.

<Modification in which Machine Learning Unit is Provided Outside Servo Control Unit>

Figure 15:
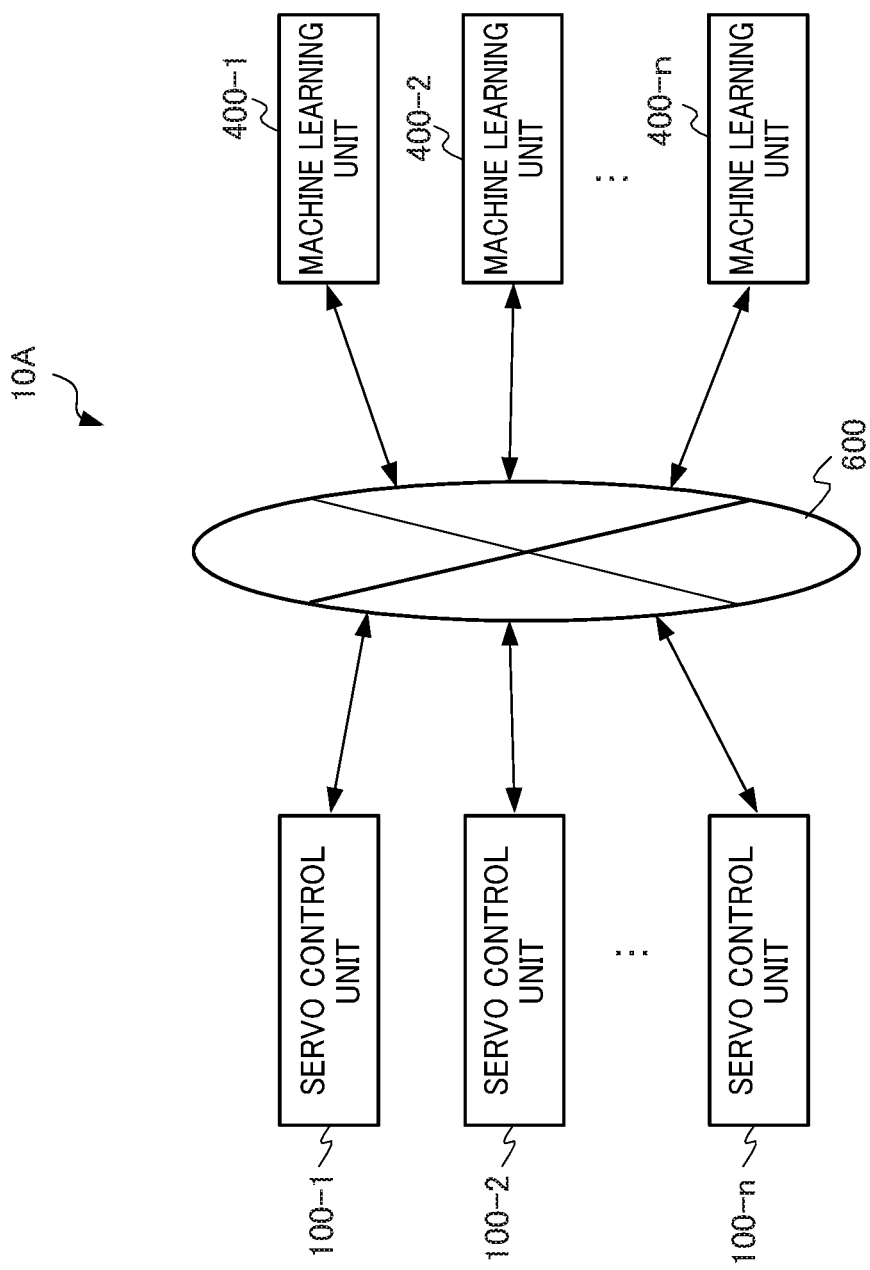
FIG. 15 is a block diagram illustrating another configuration example of a control device.

FIG. 15 is a block diagram illustrating another configuration example of the control device. A difference between a control device 10A illustrated in FIG. 15 and the control device 10 illustrated in FIG. 1 is that n (n is a natural number of 2 or more) servo control units 100A-1 to 100A-n are connected to n machine learning units 400A-1 to 400A-n via a network 600 and each have the frequency generation unit 200 and the frequency characteristic calculation unit 300. The machine learning units 400A-1 to 400A-n have the same configuration as the machine learning unit 400 illustrated in FIG. 6. The servo control units 100A-1 to 100A-n each correspond to the servo control device, and the machine learning units 400A-1 to 400A-n each correspond to the machine learning device. One or more among the frequency generation unit 200, the frequency characteristic calculation unit 300, and the initial setting unit 500 may be provided outside the servo control units 100A-1 to 100A-n.

Here, the servo control unit 100A-1 and the machine learning unit 400A-1 are communicably connected as a one-to-one correlation. The servo control units 100A-2 to 100A-n and the machine learning units 400A-2 to 400A-n are connected similarly to the servo control unit 100A-1 and the machine learning unit 400A-1. Although n pairs of the servo control units 100A-1 to 100A-n and the machine learning units 400A-1 to 400A-n are connected via the network 600 in FIG. 15, the n pairs of the servo control units 100A-1 to 100A-n and the machine learning units 400A-1 to 400A-n may be connected directly such that the servo control unit and the machine learning unit of each pair are connected directly by a connection interface. A plurality of n pairs of the servo control unit 100A-1 to 100A-n and the machine learning units 400A-1 to 400A-n may be provided in the same plant, for example, and may be provided in different plants.

The network 600 is a local area network (LAN) constructed in a plant, the Internet, a public telephone network, or a combination thereof, for example. A specific communication scheme of the network 600, whether the network uses a cable connection or a wireless connection, and the like are not particularly limited.

<Freedom in System Configuration>

In the embodiment described above, the servo control units 100A-1 to 100A-n and the machine learning units 400A-1 to 400A-n are communicably connected as a one-to-one correlation. However, for example, one machine learning unit may be communicably connected to a plurality of servo control units via the network 600 and the machine learning of the respective servo control units may be performed. In this case, a distributed processing system may be adopted, in which respective functions of one machine learning unit are distributed to a plurality of servers as appropriate. The functions of one machine learning unit may be realized by utilizing a virtual server function or the like on a cloud.

When there are n machine learning units 400A-1 to 400A-n corresponding to n servo control units 100A-1 to 100A-n of the same type name, the same specification, or the same series, the machine learning units 400A-1 to 400A-n may be configured to share the learning results in the machine learning units 400A-1 to 400A-n. By doing so, a more optimal model can be constructed.

EXPLANATION OF REFERENCE NUMERALS 10, 10A: Control device
100, 100-1 to 100-n: Servo control unit
110: Subtractor
120: Velocity control unit
130: Filter
140: Current control unit
150: Servo motor
200: Frequency generation unit
300: Frequency characteristic calculation unit
400: Machine learning unit
400A-1 to 400A-n: Machine learning unit
401: State information acquisition unit
402: Learning unit
403: Action information output unit
404: Value function storage unit
405: Optimization action information output unit
500: Initial setting unit
600: Network

What is claimed is:

1. A machine learning system that performs machine learning of optimizing coefficients of at least one filter provided in a servo control device that controls a motor, the system comprising:
an initial setting unit that sets initial values of the coefficients of the filter so as to attenuate at least one specific frequency component;
a frequency characteristic calculation unit that calculates at least one of an input/output gain and an input/output phase delay of the servo control device on the basis of an input signal and an output signal of the servo control device, of which the frequencies change; and
a filter characteristic removing unit that removes filter characteristics of an initial filter in which the initial values are set to the filter by the initial setting unit from at least one of the input/output gain and the input/output phase delay obtained on the basis of the input signal and the output signal obtained using the initial filter at the start of machine learning, wherein
the machine learning system starts machine learning of the coefficients of the filter in which the filter characteristics of the initial filter are removed by the filter characteristic removing unit so that at least the input/output gain decreases or the phase delay decreases.

2. The machine learning system according to claim 1, wherein
the input signal of which the frequency changes is a sinusoidal wave of which the frequency changes, and
the sinusoidal wave is generated by a frequency generation unit, and the frequency generation unit is provided inside or outside the servo control device.

3. The machine learning system according to claim 1, further comprising a machine learning unit including:
a state information acquisition unit that acquires state information including the input/output gain and the input/output phase delay of the servo control device output from the frequency characteristic calculation unit and the coefficients of the initial filter or the coefficients of the filter after the start of the machine learning;
an action information output unit that outputs action information including adjustment information of the coefficients of the initial filter or the coefficients of the filter after the start of the machine learning, included in the state information;
a reward output unit that outputs a reward value of reinforcement learning based on the input/output gain and the input/output phase delay output from the state information acquisition unit; and
a value function updating unit that updates an action value function on the basis of the reward value output by the reward output unit, the state information, and the action information.

4. The machine learning system according to claim 3, wherein
the frequency characteristic calculation unit outputs the input/output gain and the input/output phase delay, and
the reward output unit calculates a reward based on the input/output phase delay when the input/output gain of the servo control device is equal to or smaller than the input/output gain of an input/output gain standard model calculated from characteristics of the servo control device.

5. The machine learning system according to claim 4, wherein
the input/output gain of the standard model is a constant value at a predetermined frequency or higher.

6. The machine learning system according to claim 4, wherein
the reward output unit calculates the reward so that the input/output phase delay decreases.

7. The machine learning system according to claim 3, further comprising:
an optimization action information output unit that outputs adjustment information of the coefficients on the basis of a value function updated by the value function updating unit.

8. A control device comprising:
the machine learning system according to claim 1; and
a servo control device that controls a motor and has at least one filter for attenuating a specific frequency component.

9. A machine learning method of a machine learning system that performs machine learning of optimizing coefficients of at least one filter for attenuating at least one specific frequency component, provided in a servo control device that controls a motor, the method comprising:
setting initial values of the coefficients of the filter so as to attenuate at least one specific frequency component;
calculating at least one of an input/output gain and an input/output phase delay of the servo control device on the basis of an input signal and an output signal of the servo control device, of which the frequencies change;
removing filter characteristics of an initial filter in which the initial values are set to the filter from at least one of the input/output gain and the input/output phase delay obtained on the basis of the input signal of the servo control device and the output signal of the servo control device obtained using the initial filter at the start of machine learning; and
starting machine learning of the coefficients of the filter in which the filter characteristics are removed so that at least the input/output gain decreases or the phase delay decreases.

* * * * *